US011521253B2

(12) United States Patent
Minchew et al.

(10) Patent No.: US 11,521,253 B2
(45) Date of Patent: Dec. 6, 2022

(54) AUTONOMOUS SYSTEM TO ASSIST CONSUMERS TO SELECT COLORS (71) Applicant: Columbia Insurance Company, Omaha, NE (US)

(72) Inventors: Carl Minchew, Mountain Lakes, NJ (US); Bobby Chin, Sparta, NJ (US); Priscilla Ghaznavi, Brooklyn, NY (US); H. T. Than, Rockville, MD (US)

(73) Assignee: Columbia Insurance Company, Omaha, NE (US)

( * ) Notice: Subject to any disclaimer, the term of this patent is extended or adjusted under 35 U.S.C. 154(b) by 554 days.

(21) Appl. No.: 16/479,721

(22) PCT Filed: Jan. 24, 2018

(86) PCT No.: PCT/US2018/014958
§ 371 (c)(1),
(2) Date: Jul. 22, 2019

(87) PCT Pub. No.: WO2018/144273
PCT Pub. Date: Aug. 9, 2018

(65) Prior Publication Data
US 2021/0406974 A1 Dec. 30, 2021

Related U.S. Application Data (60) Provisional application No. 62/454,292, filed on Feb. 3, 2017.

(51) Int. Cl.
*G06Q 30/06* (2012.01)
*G06F 16/538* (2019.01)
(Continued)

(52) U.S. Cl.
CPC ......... *G06Q 30/0627* (2013.01); *G06F 3/011* (2013.01); *G06F 3/167* (2013.01);
(Continued)

(58) Field of Classification Search
CPC .......... G06Q 30/0627; G06Q 30/0639; G06Q 30/0643; G06Q 30/0631; G06T 3/40;
(Continued)

(56) References Cited

U.S. PATENT DOCUMENTS 7,659,911 B2 * 2/2010 Wittenstein .............. G09G 5/02
345/589
8,005,563 B2 * 8/2011 Cobb ........................ B64F 5/10
700/60
(Continued)

FOREIGN PATENT DOCUMENTS

EP 2728548 A2 * 5/2014 ............... G06T 3/60

OTHER PUBLICATIONS

González Linares; José M.; Guil Nicolás; Ramos Cózar, Julián "Robust Tracking for Augmented Reality Advances in Computational Intelligence"; Published Jun. 25, 2015 in 13th International Work-Conference on Artificial Neural Networks, IWANN 2015. Proceedings: LNCS 9094: 301-8; xxv+593. Springer International.*
(Continued)

*Primary Examiner* — Yogesh C Garg
(74) *Attorney, Agent, or Firm* — The H.T. Than Law Group (57) ABSTRACT

An autonomous App for selecting color is disclosed. The App includes (i) receiving an oral query concerning a color from a user, (ii) converting the oral query into a digital signal, (iii) associating the queried color with indicia of said queried color in a color database, and (iv) communicating an oral response to the user based on the queried color. The App resides in a general computing machine, such as a smart phone, a smart speaker or a computer tablet. The App can also guide the user to color merchandises on a color display by the general computing machine capable of augmenting an image of the color display with color information.

18 Claims, 8 Drawing Sheets

(51) Int. Cl.
  *G06F 3/01* (2006.01)
  *G06F 3/16* (2006.01)
  *G06T 3/40* (2006.01)
  *G06T 3/60* (2006.01)
  *G06T 11/00* (2006.01)

(52) U.S. Cl.
  CPC ....... *G06F 16/538* (2019.01); *G06Q 30/0639* (2013.01); *G06Q 30/0643* (2013.01); *G06T 3/40* (2013.01); *G06T 3/60* (2013.01); *G06T 11/001* (2013.01); *G06Q 30/0631* (2013.01); *G06T 2200/24* (2013.01)

(58) Field of Classification Search
  CPC ..... G06T 3/60; G06T 11/001; G06T 2200/24; G06F 16/538; G06F 3/167; G06F 3/011
  USPC ............................................. 705/26.63, 26.62
  See application file for complete search history.

(56) References Cited

U.S. PATENT DOCUMENTS

| | | | |
|---|---|---|---|
| 8,070,628 | B2 | 12/2011 | Denton et al. |
| 8,070,629 | B2 | 12/2011 | Balardeta et al. |
| 8,843,371 | B2 | 9/2014 | Levien et al. |
| 2002/0191862 | A1 | 12/2002 | Neumann et al. |
| 2005/0125119 | A1* | 6/2005 | Srack ................... G01B 5/0025 702/152 |
| 2005/0275842 | A1 | 12/2005 | Simons et al. |
| 2007/0247393 | A1* | 10/2007 | Kuroki ..................... G06T 1/00 345/8 |
| 2008/0232101 | A1 | 9/2008 | Minchew et al. |
| 2010/0303337 | A1 | 12/2010 | Wallack et al. |
| 2013/0282345 | A1 | 10/2013 | McCulloch et al. |
| 2014/0118339 | A1 | 5/2014 | Davies et al. |
| 2014/0232879 | A1 | 8/2014 | Gottwals et al. |
| 2016/0123745 | A1 | 5/2016 | Cotier et al. |
| 2016/0155025 | A1 | 6/2016 | Arora et al. |
| 2016/0189397 | A1* | 6/2016 | Mullins ..................... G06T 7/90 345/633 |
| 2016/0203647 | A1 | 7/2016 | Friesen |
| 2016/0260251 | A1 | 9/2016 | Stafford et al. |

OTHER PUBLICATIONS

Theses, Content creation for seamless augmented experiences with projection mapping Jones, Brett R. ProQuest Dissertations and Theses. ProQuest Dissertations Publishing. (2015) ; retrieved from Dialog database on Sep. 1, 2022; (Year: 2015).*

International Search Report and Written Opinion issued in connection with the corresponding International Application No. PCT/US2018/014958 dated Apr. 17, 2018.

Partial Supplemental European Search Report issued in connection with the corresponding European Patent Application No. 18 74 7148 dated Jul. 29, 2020.

Extended European Search Report issued in connection with the corresponding European Patent Application No. 18 74 7148 dated Dec. 12, 2020.

* cited by examiner

AUTONOMOUS SYSTEM TO ASSIST CONSUMERS TO SELECT COLORS

FIELD OF THE INVENTION

This invention generally relates to an apparatus and a method of assisting consumers to locate and select paint colors at the point of sale (POS).

BACKGROUND OF THE INVENTION

Locating a color at a paint store by its name can be frustrating, because there exists no user-friendly or direct connection from a color name to the color itself or its color chip. A consumer may look up color identification indicia with a color name on a printed index at the back of a fan deck comprising hundreds of color chips or by using the paint store's software to tint paint or the paint store's retail POS software, if it is loaded with relevant information.

Selecting paint colors can be intimidating and cumbersome for consumers untrained in color theories. Color displays at paint stores or hardware stores contain multiple hundreds of color chips arranged in various hues, saturations and values with little explanation as to where to begin or where the desired color chips are located on the display. Consumers are often unsure what color libraries are available and which library has the color combination or palette that they need. Often paint store employees are also not trained in color theories, and interior designers are not available, or not available sufficiently to assist consumers.

There remains a need for a system that interacts with consumers and guides the consumers through some or all of the color selection process with or without assistance from the store employees or designers.

SUMMARY OF THE INVENTION

Hence, the invention is directed to an autonomous software application ("App") for selecting colors.

The invention is also directed to an App that includes the steps of (i) receiving an oral query concerning a color from a user, (ii) converting the oral query into a digital signal, (iii) associating the queried color with indicia of said queried color in a color database, and (iv) communicating an oral response to the user based on the queried color. The App resides in a general computing machine, such as a smart phone, a smart speaker or a computer tablet. The App can also guide the user to color merchandises on a color display by the general computing machine capable of augmenting an image of the color display with color information.

The App may incorporate an augmented reality (AR) and/or virtual reality ("VR") color finder to assist the consumer with locating the selected color and the recommended colors, discussed above, on color display 10. In this embodiment, color display 10 is displayed or reproduced on a digital screen via a camera feed augmented with digitally added virtual elements like indicators pointing or highlighting to the locations of the selected/recommended colors on the color display, as well as displaying related color information. The screen can be the screen from a smart phone or computer tablet, and the screen may also be the lenses of a pair of VR glasses. A cross-hair, an arrow, a pointing index finger or other sign/indicator(s) may point to the locations of the selected/recommended color(s).

The present invention is directed to an autonomous method for selecting color comprising the steps of:
(i) receiving an oral query concerning a color from a user,
(ii) converting the oral query into a digital signal,
(iii) associating the queried color with indicia of said queried color in a color database,
(iv) communicating an oral response to the user based on the queried color, wherein said autonomous method is a software App residing in a general computing machine.

The autonomous may further comprise the step of
(v) guiding the user to one or more color merchandises relating to the queried color. This guiding step may (a) include the step of communicating another oral response of a coordinate of the one or more color merchandises to the user; (b) include the step of highlighting the one or more color merchandises to the user; and/or (c) include augmenting an image of said one or more color merchandises on a screen of said general computing device with a virtual color space and an indicator showing the queried color.

In step (v)(c), the virtual color space zooms and/or rotates to synchronize with said image. The one or more color merchandises may comprise at least two marker points and the virtual color space may comprise at least two corresponding virtual markers, and the virtual color space and said image are synchronized when the marker points and the virtual markers are matched.

The autonomous method of claim 1 further comprising one or more of the following steps:
(vi) receiving another oral query from the user concerning one or more colors that match with the queried color;
(vii) receiving another oral response from the user concerning an application for the queried color;
(viii) communicating another oral to the user with one or more recommended colors, and/or
(ix) displaying a room scene to the user.
step (ix) may include coloring said room scene with at least one of the queried color and one or more recommended colors.

The present invention is further directed to another autonomous method for assisting a user to locate one or more colors on a color display comprising the steps of
(i) obtaining an image of the color display on a digital computer screen held by the user;
(ii) augmenting said image with a virtual color space and at least one indicator showing said one or more colors;
(iii) rotating and/or zooming the virtual color space to synchronize the virtual color space to said image as the user moves relative to the color display;
wherein the color display comprises at least two marker points and the virtual color space comprises at least two corresponding virtual markers, and wherein virtual color space and said image are synchronized when the marker points and the virtual markers are matched.

This autonomous method may further comprise step (iv) of repeating step (iii) as the user moves relative to the color display and/or (v) predicting the consumer's movement by triangulating the at least two marker points and the user.

The present invention also includes a general computing device comprising said digital computer screen and capable of performing the autonomous methods described herein. The general computing device may include at least one of a pair of virtual reality glasses, a smart phone or a computer tablet.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

The present invention provides an autonomous process and apparatus to aid consumers or users when the consumers walk into a point of sale for paints, which can be retail paint stores or the paint department in hardware stores or in large do-it-yourself (DIY) centers. The inventive autonomous process can be software, firmware, or software applications (App or Apps) that receives inputs, preferably voice inputs, from the consumers or users and communicates outputs, preferably voice outputs, virtual reality (VR) and/or augmented reality (AR) to assist the consumers and the inventive apparatus can be a general computing device that stores the autonomous process, such as a smart phone, a computer tablet, a laptop, a desktop, a pair of VR glasses or a smart speaker with Internet connectivity to a cloud storage.

In an embodiment, the App is housed in a smart phone, a computer tablet, a smart speaker or VR glasses, as discussed below. The App can be downloaded to the smart phone/tablet in the paint store or at any time prior to the visit to the paint store. Alternatively, the App may reside in the cloud storage and a smart speaker can access the App as well as data from the cloud. As used herein, a smart speaker can be a Bluetooth or Wi-Fi speaker that has a microprocessor, a receiver for receiving a consumer's commands or questions and a speaker to communicate responses to the consumer. The smart speaker is connected to the Internet and the cloud storage via Wi-Fi or Ethernet cables. Smart speakers are commercially available as Amazon.com's Echo devices or Google Home devices, which can be re-programmed to work with the inventive App, or smart speakers can also be built to be used with the App and the designated cloud storage. Alternatively, the App may reside in a computer or laptop in the paint store and be uploaded to the consumer's smart phone or tablet via mini-USB cable, micro-USB cables or Apple®'s Lighting cables. The smart phone or tablet may also communicate with the in-store computer via Bluetooth or Wi-Fi instead of cloud storage. Hereinafter, the term App includes the software/App and the device(s) that the App resides on.

Figure 1:
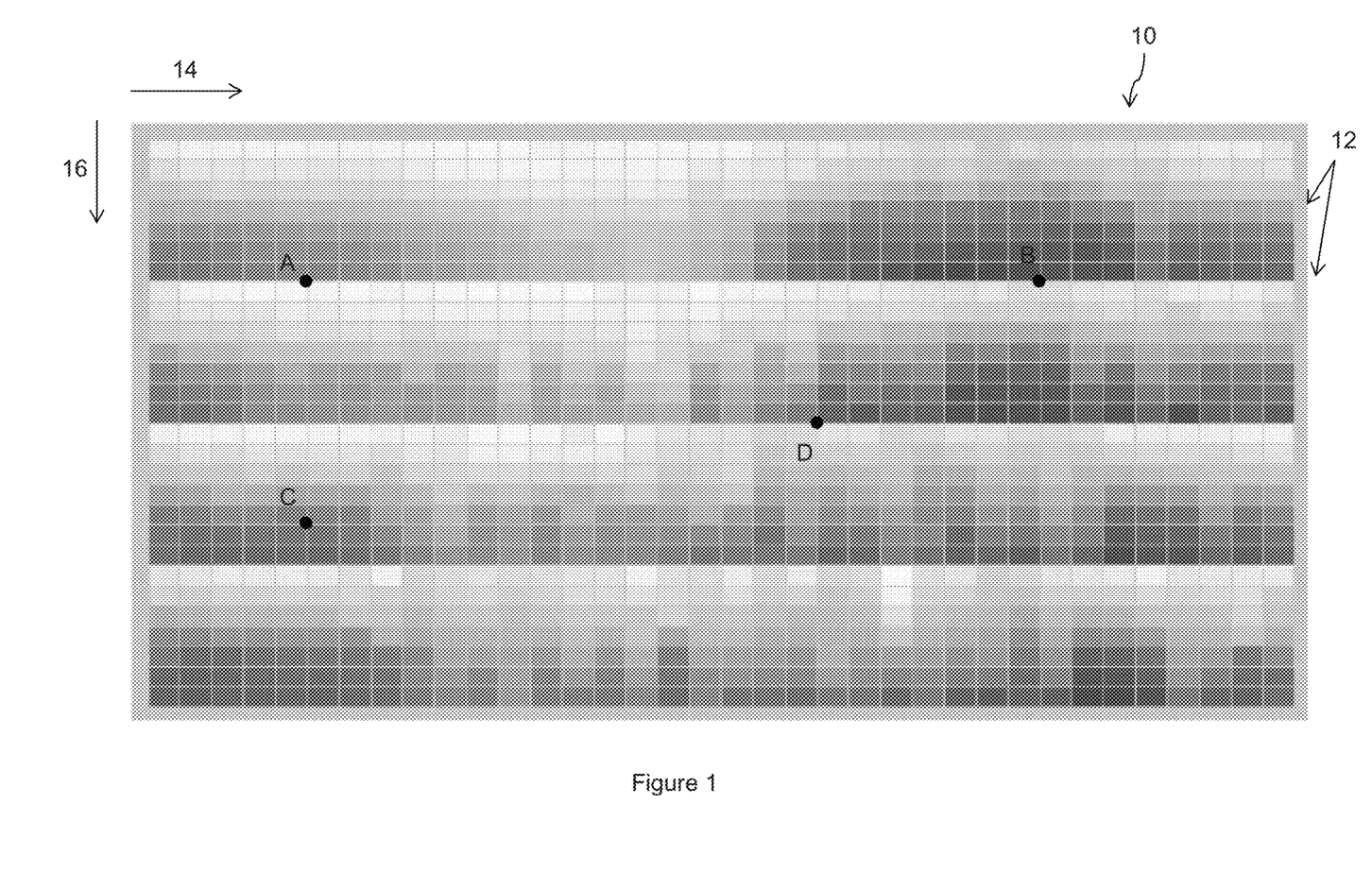
FIG. 1 is an exemplary color display for a paint store.

According to one aspect of the present invention, the App receives a query from the consumer about a specific color and can direct the consumer to the location of a color chip representing that color in a physical color display. The App can direct the consumer to the color display and identify the location of the color chip for example by the row and column numbers, as illustrated in FIG. 1. As shown, physical color display 10 is preferably a part of an upright cabinet that has an array of pockets or slots 12 arranged in rows 14 and columns 16. Each pocket or slot 12 contains at least one color chip and preferably multiple copies of the color chip.

When a consumer asks for a particular color, the App receives the verbal query about a specific color and translates it to a digital signal, and preferably uses a look up table (LUT) to locate the position of the queried color on color display 10. As stated above, the App may via the built-in speaker in the smart phone or smart speaker identify the row and column of the color chip to the consumer. Alternatively or additionally, the App may direct a light source, such as a focused LED light, mounted proximate to color display 10 to shine on the queried or selected color on the color display.

In another embodiment, the consumer may further ask the App additional questions relating to the queried color. In one example, the consumer may ask the App what colors go with the queried color. The App then may engage the consumer in an interaction that may include asking the consumer the application or planned use of the queried color, i.e., the type of room where the queried color would be applied. In one example, if the consumer provides a particular application for the queried color, the App may provide a color palette with colors that are harmonious with the queried color. The App may also provide a recommendation as to the type of paints for that application, e.g., low VOC, longer open time, high scrubability, durability, etc. The App may specifically identity for example the recommended paints' brand names, premium or economical paints, and manufacturer's names. In another example, the customer may request additional information about the popularity or common uses of a specific color or set of colors, e.g., "how often is this color used in dining rooms in Boston?"

If the consumer does not wish to provide an application for the queried color, the App may offer popular colors that are harmonious with the queried color, or colors that are often purchased with the queried color, or colors that have the similar color emotions as the queried color.

The colors recommended by the App may be preselected by color experts or designers, or may be based on classical color wheel theories, such as complementary colors, triad colors, split complementary colors, split triad colors, etc. The recommended colors may also vary in hue, saturation or value (lightness) from the queried color. The recommended colors may be harmonious with the queried color or have similar color emotions as the queried colors based on human psychophysical reactions, which are disclosed in U.S. Pat. Nos. 8,427,498 and 9,134,179 and U.S. patent application publication no. US 2015/0268098. These references are incorporated herein by reference in their entireties.

Notwithstanding whether the consumer provides an application for the queried color, the App may probe to determine whether the consumer needs additional guidance. In one example, the App may ask whether the consumer would like to see sample room scenes with the queried color and recommended colors applied to the sample room scene. Alternatively or additionally, the App may ask the consumer whether the consumer has digital photograph(s) of the consumer's room(s) and whether the consumer wants to load such photograph(s) to the App.

If the App is deployed on a smart phone or a device with a touch screen, then the App may ask the consumer to drag a color, which can be the queried color or a recommended color, to a particular surface to "paint" the room scene, and repeat this process until all the surfaces are painted. The consumer may change the color of a surface in the room scene by dragging a different color to that surface.

If the App is deployed on a smart speaker, the App may display the room scene on a computer display or television screen in the store and may label the different surfaces in the room scene with unique label, and the App can receive instructions from the consumer as to which color should paint which surface. The computer display or television screen may also have touch screen capability, which would allow the consumer to drag colors to surfaces.

The App may also advise the consumer what colors are trending in the home déecor market, such as trending colors for colonial bathrooms or traditional colors for a saltbox home's exterior. The App may also add colors to a shopping list, order wet or dry color samples or order paints.

After the consumer has selected a color palette, the App may show the consumer the location of the selected colors on color display 10, either by rows and columns or by highlighting the locations of the color chips on color display 10. The App may also send the selected color palette and/or the painted room scene to the consumer's smart phone, email account, and/or the consumer's social media such as Facebook, Pinterest, etc.

Figure 2:
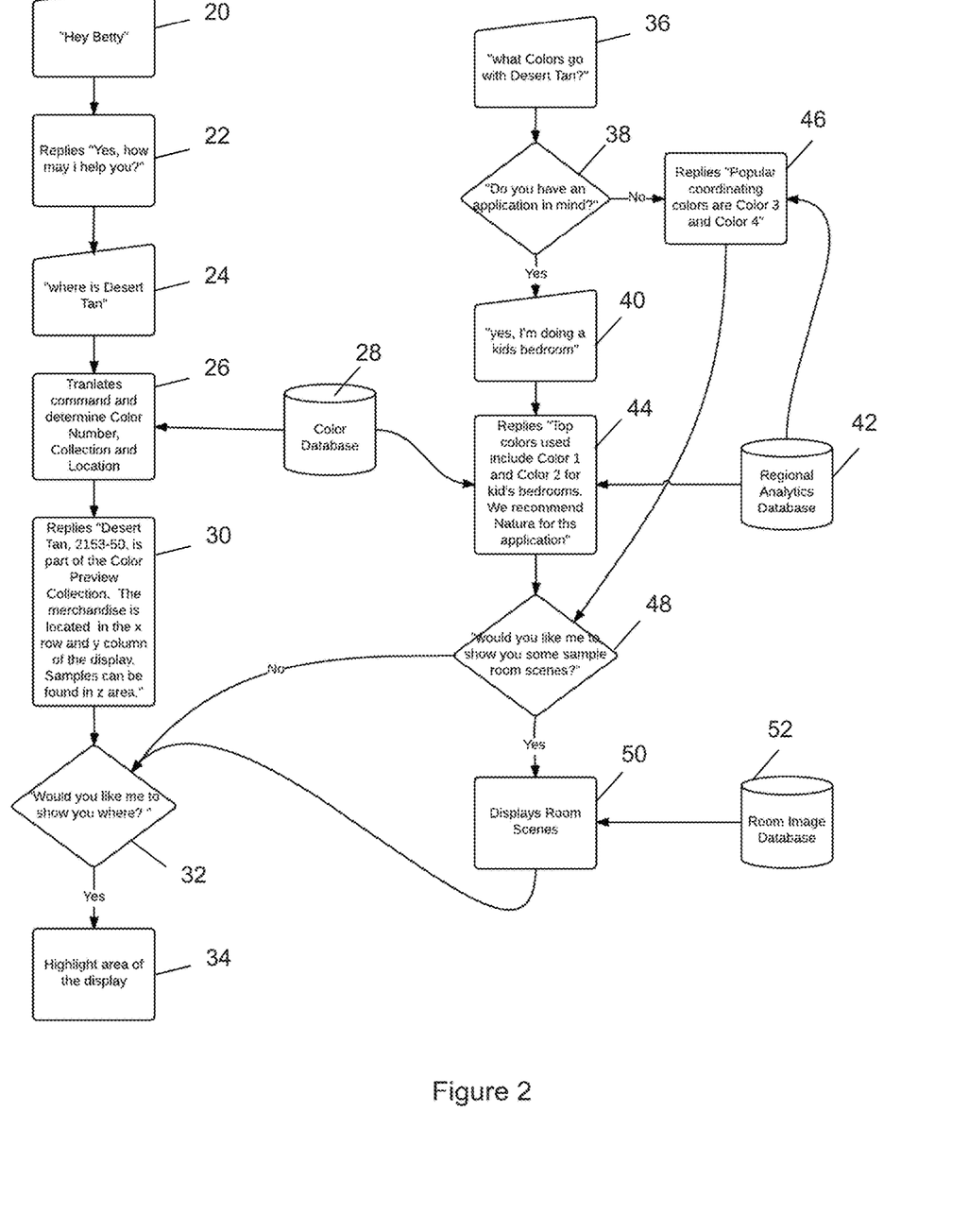
FIG. 2 is flowchart summarizing an inventive autonomous App.

An exemplary flow chart representing the App is shown in FIG. 2. To conserve computing power, the App is normally in a sleep mode and is configured to listen only for one or more wake-up word. An exemplary wake-up word is "Betty" for Betty Moore, who was a fictitious spokesperson that for a number of years was used by the Benjamin Moore Company.

In step 20, the App would detect the wake-up word, and replies in step 22 to the consumer that the App is activated. The consumer's query is received by the App in step 24. In step 26 the App translates or converts the oral query into digital signal and determines preferably from a LUT and/or a color database 28 the color indicia, such as color number, color emotion scores, color collection/library and the location of the corresponding color chip(s) on color display 10.

In step 30, the App sends preferably through a speaker a response to the consumer's query, which may include the library or collection that the queried color belongs, the location of the corresponding color chip on color display 10 and where paint samples or other color merchandise can be found. In step 32, the App may optionally ask the consumer whether the consumer needs assistance in locating the queried color, for example by highlighting the display or the row/column of the queried color on color display 10 in step 34.

In another embodiment, if the consumer asks further advice, such as what colors go with the queried color, e.g., harmonious with the queried color, having similar hue or saturation or having similar color emotions discussed above, in step 36, then the App could ask the consumer for the intended application of the queried color in step 38.

If the consumer provides a room where the queried color would be applied in step 40, the App could consult with the color database 28 and/or the regional analytics database 42 and in step 44 communicates to the consumer the recommended color(s) and the recommended paint, e.g., Natura® premium, low-VOC paints. Regional analytics database 42 may include information, such as the color trends in certain regions, such as Southwest, Pacific Northwest, New England, etc.; popular colors that are sold together with the queried color; or popular colors that are selected in the same palettes with the queried color.

If the consumer does not provide an application for the queried color, in step 46 the App could still provide recommended colors based on the queried color and the regional analytics database in step 46.

After the recommended colors are communicated in either step 44 or step 46, the App may ask the consumer whether to view sample room scene or to upload digital photographs or other rendering of the consumer's own room(s) in step 48.

If the consumer does not want to see room scene, the App should revert to step 32 to ascertain whether the consumer needs assistance in locating color chips or other color merchandise for the recommended colors. If the consumer wants to see the room scene, then the App in step 50 displays the room scene(s) either from a room image database 52 or from the consumer's photograph(s). As discussed above, step 50 may allow the consumer to choose what color paints what wall surface in the room scene.

Figure 3:
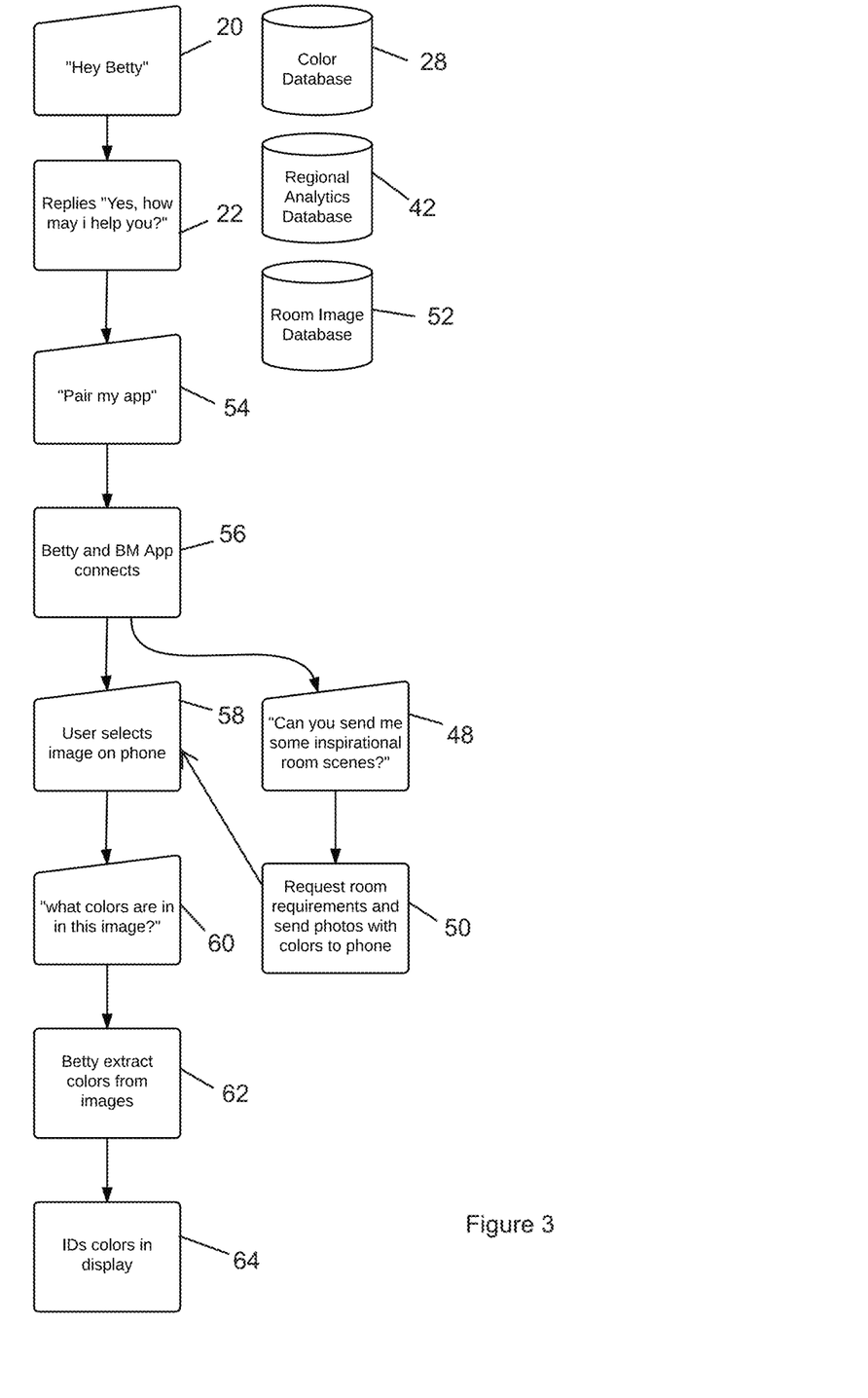
FIG. 3 is another flowchart illustrating another aspect of the autonomous App.

The App may perform other steps or functions, such as extracting a color palette from a photograph or a painting or a famous painting. As shown in FIG. 3, the App may be activated and may confirm its activation by steps 20 and 22, and databases 28, 42 and 52 may be consulted. The consumer may pair the App with other software or applications in step 54 and the App then makes such connection in step 56. The other software or applications may include sending the requested photographs and room requirements, as shown in steps 48 and 50. If the consumer selects an image or photograph in step 58 and requests the identification of colors in the requested photograph(s) in step 60, then the App may extract the colors from the photograph in step 62 and displays the identification of the colors in step 64. Some or all of the steps shown in FIG. 2 and in FIG. 3 can be used in with each other.

According to another aspect of the present invention, the App may incorporate an augmented reality (AR) and/or virtual reality ("VR") color finder to assist the consumer with locating the selected color and the recommended colors, discussed above, on color display 10. In this embodiment, color display 10 is displayed or reproduced on a digital screen via a camera feed augmented with digitally added virtual elements like indicators pointing or highlighting to the locations of the selected/recommended colors on the color display, as well as displaying related color information. The screen can be the screen from a smart phone or computer tablet, and the screen may also be the lenses of a pair of VR glasses. A cross-hair, an arrow, a pointing index finger or other sign/indicator(s) may point to the locations of the selected/recommended color(s).

The augmented reality capability is accomplished by including a plurality of position or marker points on the physical color display 10. The digital screens or glasses use photo sensors, such as digital cameras typically included in the tablets or smart phones, to display a live image of the color display 10 and would use recognition software and/or sensors, described below, to identify the marker points on the physical color display (10). Once the marker points are identified, the App by using additional software, also described below, can calculate the size of and distance to the color display 10, and by using a predetermined map of the locations of the color chips in color display 10 the App can highlight or locate the selected/recommended color (s). In an augmented reality setting, the view of the color display would be a live image of the display with the color chip locator layered onto the image. The live image of the actual color display may also be overlapped by a virtual color space with the color chip locator layered thereon. The locations of the color chips in color display 10 would be the same as the locations of the colors in the virtual color space.

Referring to FIG. 1, position or marker points A, B, C and/or D are assigned to color display 10. It is well known that three points in space define a rectilinear plane. However, since color display 10 would generally be positioned in a vertical orientation in a paint store incorporated on to an upright cabinet or other furniture, two marker points (or more) are needed to help locate the color chips in the augmented reality display. As shown, markers A and B are preferably located on a substantially horizontal straight line, and are used herein for the purpose of discussing the augmented reality feature based on a horizontal distance. However, markers A and D and markers B and D can be used, so long that the marker pairs have a horizontal distance between them. Markers A and C can be used for vertical distance and likewise markers, A and D, B and C, and B and D can be used, since they have a vertical distance between them. Although four marker points are illustrated in FIG. 1, any number of marker points can be used.

Figure 4:
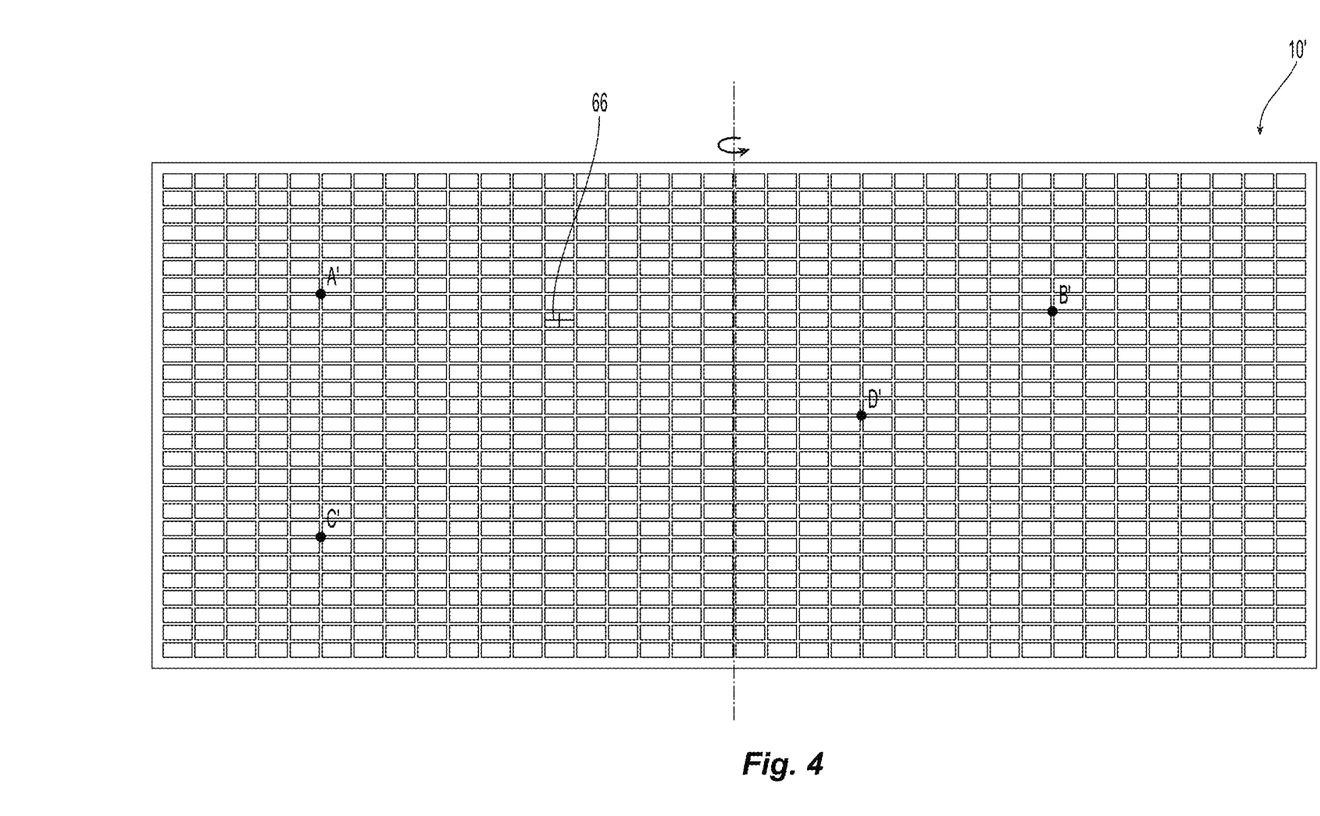
FIGS. 4-7 are representations of a virtual color space being viewed at various angle.

Referring to FIG. 4, a virtual color space 10' is created on the tablet/phone screen or VR glasses, where each rectangular element on virtual color space 10' matches or corresponds to a color chip on color display 10. Virtual markers A', B', C' and/or D' are marked on virtual color space 10' at locations corresponding the actual marker points A, B, C and D. An optical sensor, preferably a digital camera, may be pointed at the color display 10, which fills the digital screen or VR glasses with a live image of the color chips on color display 10. The App superimposes virtual color space 10' on top of the live image of color display 10. When two or more virtual markers on color space 10' and corresponding markers on color display 10 match each other, color space 10 and virtual color space 10' are synchronized. Virtual color space 10' can be zoomed in or zoomed out and/or rotate to synchronize. The location of the selected/recommended color(s) on virtual color space 10' is highlighted with an indicator 66, such as a cross-hair, check mark, or a pointer. Indicator 66 would also superimpose on the color chip on the image of color display 10 that corresponds to the selected/recommended color(s). One or more indicator 66 can be used, and one specific indicator, e.g., cross-hair, can be used for the selected color and another indicator, e.g., check mark, can be used to the recommended color(s).

Marker points A, B, C, and/or D on color display 10 illustrated in FIG. 1 can be any device or material that facilitates their detection by the digital camera or other optical sensors. These marker points can preferably be relatively small, e.g., significantly smaller than the dimensions of a color chip. Radio frequency identification (RFID) devices that respond to a RF query by broadcasting a return RF signal can be marker points. The VR glasses or smart table/phone can be equipped to send a RF query. Alternatively, infrared (IR) frequency devices that broadcast IR signals at known wavelengths that are readable by the VR glasses or smart table/phone can be marker points. Alternatively, the marker points A, B, C, and/or D can be unique colored LEDs or other visible/invisible electromagnetic radiation that are readable by the VR glasses and smart tablet/phone.

Figure 5:
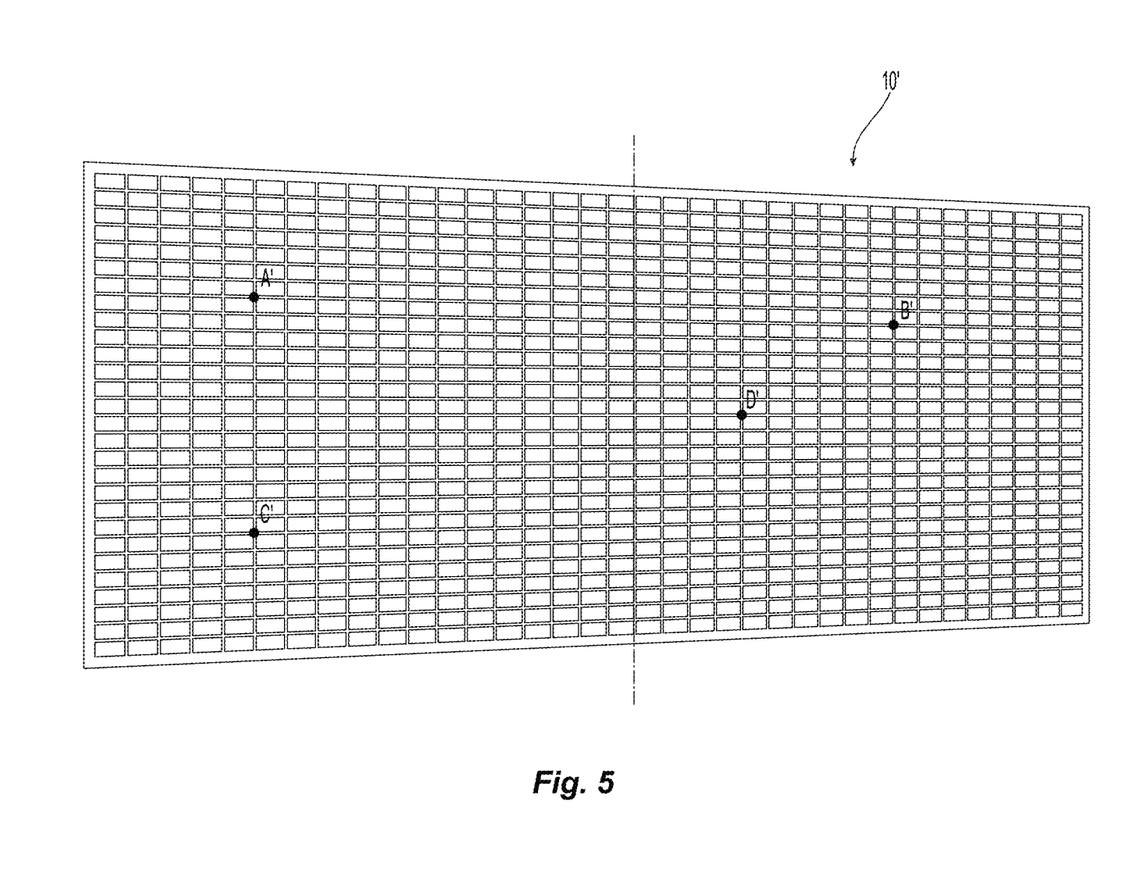
Figure 6:
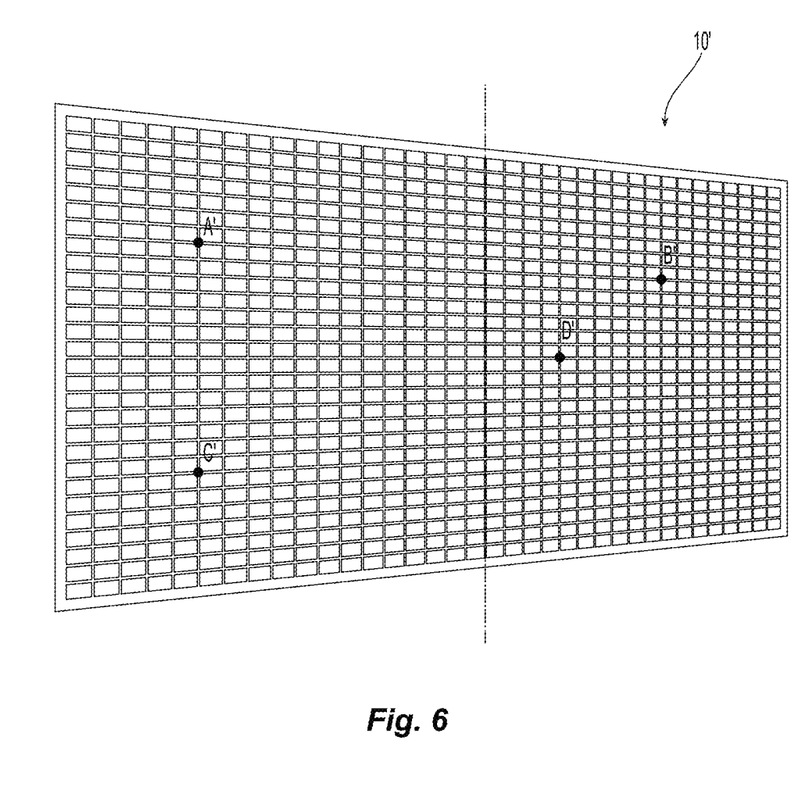
Figure 7:
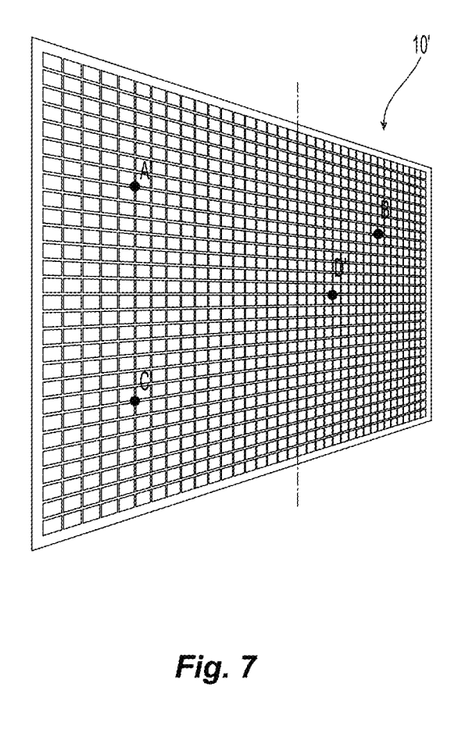

The horizontal distances, as well as vertical distances under certain situations, between marker points A, B, C and/or D may appear shorter depending on the viewing angle of the consumer. It the consumer stands to the left or far left of color display 10, the right side of color display 10 would appear smaller is size than the left side due to the off-center perspective view. FIG. 5 illustrates this effect when the consumer stands to the left of color display 10. FIG. 6 illustrates this effect when the consumer stands more to the left and FIG. 7 shows what the consumer may see from the far left. A similar but opposite effect would occur if the consumer moves or stands to the right. For simplicity, the present invention is discussed only with the consumer stands or moves to the left. Rightward movements can be easily understood from the descriptions below.

As discussed above, when the consumer stand substantially in front and center of color display 10, as illustrated in FIG. 4, the App can zoom in or out virtual color space 10' to synchronize the marker points A, B, C and/or D to the virtual markers A', B', C' and/or D' by expanding or reducing the area of virtual color space 10' proportionally until the marker points and the virtual markers overlap. However, as illustrated in FIGS. 5-7, the color space assumes a trapezoidal shape when the consumer moves or is positioned to the left (or right). Hence, expanding or shrinking virtual color space 10' alone would not synchronize the marker points to the virtual markers.

The present invention resolves this issue by optionally matching one marker point to one virtual marker, e.g., A and A', and by rotating the virtual color space 10' in this example, clockwise until another marker point matches a virtual marker, e.g., B and B' or D and D'. Once the markers are synchronized, the selected and recommended colors can be highlighted by indicators 66.

In a preferred embodiment, the App is autonomous and is able to decide whether to zoom in or out, or to rotate clockwise or counterclockwise or both to synchronize the marker points to the virtual markers. In one embodiment of the present invention, a triangulation technique is employed. This triangulation uses two marker points, e.g., A and B, and the location of the consumer with the AR glasses or smart tablet/phone, which is set at the digital camera lens, labeled as "χ" in FIGS. 8-10. The AR glasses or smart tablet/phone would also have a distance or proximity sensor that can measure distance from the digital camera lens to the marker points A, B. The AR glasses or smart tablet/phone typically would also have gyroscope or accelerometer to determine the direction that the devices points. Smart phones and tablets use this feature to support a compass app commonly available in such devices. Such distance or proximity sensors are used to measure the distance from a golf tee/fairway/sand trap to a flag on the putting green. When the left distance, Dl, from χ to marker point A is substantially the same as the right distance, $D_r$, to marker point B, as illustrated at point $P_1$ in FIG. 8, then the App would know that virtual color space 10' only needs to be zoomed in or out to synchronize with an image of color space 10 on the screen.

Figure 8:
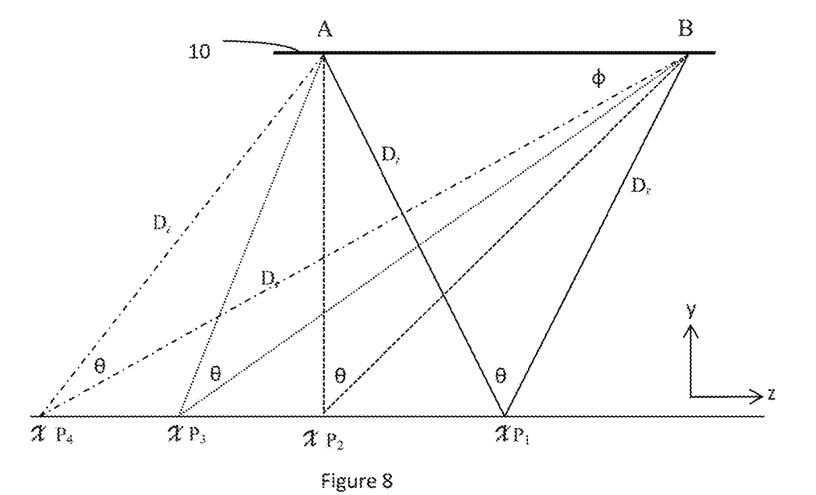
FIG. 8 is a top schematic view of a consumer located at various angle viewing the exemplary color display.

If the consumer stands to the left at position $P_2$, then $D_r$>Dl and the App would also rotate to synchronize. At position $P_3$, the App would rotate more, and at position $P_4$, where $D_r$>>Dl the App would know to rotate virtual color space 10' even more. The amount of rotation depends on the difference (Δ) between $D_r$ and Dl. Higher ΔD requires more rotation. Also, $D_r$>Dl requires clockwise rotation, as shown in FIG. 8, and $D_r$<Dl requires counterclockwise rotation. Hence, the inventive autonomous App can self-adjust to synchronize the virtual markers to the marker points to highlight the selected/recommended colors to the consumers on the screen, notwithstanding the position of the consumers relative to the color display 10.

Figure 9:
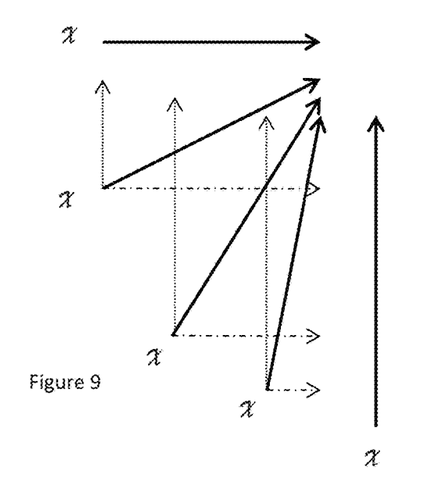
FIG. 9 is a schematic view of the various vectors or angles that a consumer may approach the exemplary color display.

In accordance to another embodiment of the present invention, the App may highlight the selected or recommended colors as the consumer is traveling or walking toward color display 10 in the paint store. In other words, the App may dynamically adjust virtual color space 10' while the consumer is moving toward color display 10 or while walking around the paint store. The App may anticipate which way to adjust virtual color space 10' based on the consumer's motions. In other words, the App would try to keep up so that virtual color space 10' follows the image of color display 10 moves on the screen, while the consumer moves. FIG. 9 illustrates that the consumer represented as "χ" may take paths that are in the Z-direction parallel to color display 10, in the Y-direction orthogonal to color display 10, or in a diagonal direction that has a Z-component and a Y-component.

Figure 10:
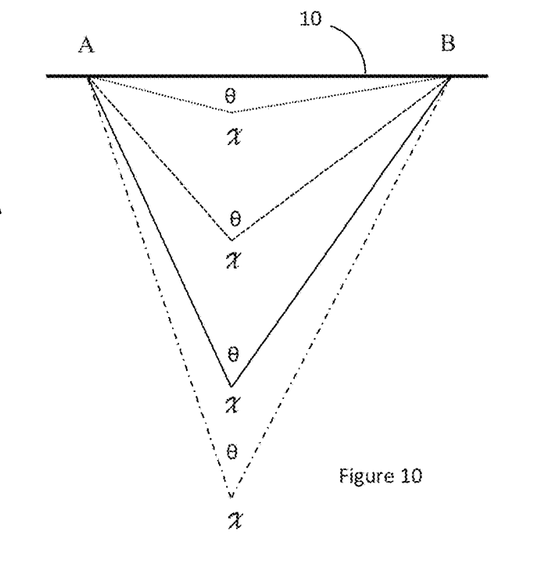
FIG. 10 is a top schematic view of a consumer located at various distances from the exemplary color display.

Referring to FIGS. 8 and 10, the angle theta (θ) is defined as the angle between $D_r$ and Dl or the distances from χ to two marker points, such as A and B. FIG. 8 shows the changes in angle θ as χ moves away from the center at $P_1$ to the left toward $P_4$. Angle θ has its highest value or maxima when χ is substantially between the two marker points A and B and decreases as χ moves leftward, as shown in FIG. 8, or rightward long the Z-direction. Hence, if the rate of change of angle θ is negative, i.e., θ is decreasing then the user χ is moving in the Z-direction. Additionally, if $D_r$ is longer than Dl then χ is moving to the left, and vice versa. In another example, if the angle θ increases to a maxima and then decreases, then the App knows that the consumer is traversing across color display 10 from left-to-right or right-to-left. Hence, by monitoring the rate of change of θ as a function of Z-direction (dθ/dZ) and the relative distances $D_r$ and Dl, the App could predict the consumer's next position and rotate virtual color space 10' accordingly ahead to minimize synchronization time.

Similarly, the angle θ increases as both distances $D_r$ and Dl decrease when the consumer approaches color display 10 in the Y-direction, as shown in FIG. 10. The App may also monitor these parameters and may anticipate whether to zoom in or zoom out to minimize response time for synchronization.

An advantage of having a predictive capability is that the App can rotate and zoom virtual color space 10' along with the moving image of color display 10 as it is displayed on the VR glasses or the screen of the smart table/phone, even when the App is not yet able to position or re-position indicators 66 on the selected/recommended colors. This predictive capability provides a better experience and feedback for the consumers.

Referring back to FIG. 8, the angle θ at point $P_4$ can be expressed as:

$$\sin \theta = (\text{orthogonal distance from point } A \text{ to distance } D_r)/\text{distance } Dl$$

based on the trigonometry function of sine. The angle φ between line segment AB and $D_r$ as $$\sin \varphi = (\text{orthogonal distance from point } A \text{ to distance } D_r)/AB.$$

A simple substitution to eliminate this orthogonal distance yields $$\sin \theta = (\sin \varphi \cdot AB)/Dl).$$

Since, $\sin^{-1}(\sin \theta) = \theta$, for $-\pi/2 \leq \theta \leq \pi/2$, $$\theta = \sin^{-1}((\sin \varphi \cdot AB)/Dl).$$

In this equation, the angle θ is expressed in term of φ and Dl. Dl can be directly measured by sensor as discussed above, and the angle φ is formed on one side by a known, fixed line segment AB, and on the other side by segment $D_r$, whose orientation/direction on the Y-Z plane can be measured by sensor as discussed above.

Alternatively, the angle θ can be derived from the measured segments Dl and $D_r$ and their orientations and angles relative to line segment AB on the Y-Z plane, preferably with the measurement uncertainties being minimized.

In another embodiment, with the predictive capability virtual color space 10' may appear to bounce as the consumer walks toward color display 10. Virtual color space 10' may zoom in and out and may rotate back and forth based on the App's prediction of the consumer's movements, until virtual color space 10' settles on a position relative to color display 10 and display indicators 66.

As discussed above and shown in FIGS. 4-7, the virtual color space 10' is shown as a grid comprising cells created by vertical and horizontal lines with each cell corresponds to a color chip in color display 10. It is noted that these lines may have a lighter line weight or be displayed as broken lines and these lines may be hidden, i.e., not shown in some embodiments.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. An autonomous method for assisting a user to locate one or more colors on a color display to be executed on a general computing device, said autonomous method comprises steps of:
   obtaining an image of the color display on a digital computer screen on the general computing device held by the user;
   augmenting said image with a virtual color space and at least one indicator showing said one or more colors;
   rotating and zooming the virtual color space to synchronize the virtual color space to said image as the user moves relative to the color display;
   wherein the color display comprises at least two marker points and the virtual color space comprises at least two corresponding virtual markers, and wherein the virtual color space and said image are synchronized when the marker points and the virtual markers are matched;
   wherein the rotating and zooming step comprises matching one marker point to one virtual marker and rotating the virtual color space until another marker point matches another virtual marker.

2. The autonomous method of claim 1 further comprising the step of repeating step of rotating and zooming the virtual color space to synchronize the virtual color space to said image as the user moves relative to the color display.

3. The autonomous method of claim 1 further comprising the step of predicting the consumer's movement by triangulating the at least two marker points and the user.

4. The autonomous method of claim 3, wherein the triangulation step utilizes a first distance between the user and one of the marker points and a second distance between the user and the other marker point.

5. The autonomous method of claim 4 further comprising a step of predicting the user's motion relative to the color display, wherein an angle (θ) is defined between said first and said second distance, wherein the predicting step utilizes a rate of change angle (θ) along a direction (z) parallel to the color display (dθ/dz), said first distance and said second distance.

6. The autonomous method of claim 1, wherein the general computing device comprises a pair of virtual reality glasses.

7. The autonomous method of claim 1, wherein the general computing device comprises a smart phone or a computer tablet.

8. The autonomous method of claim 1 for assisting the user to locate one or more colors and further comprising a method for selecting colors, which comprises steps of:
  receiving an oral query concerning a color from a user,
  converting the oral query into a digital signal,
  associating the queried color's digital signal with indicia of said queried color in a color database,
  communicating an oral response to the user based on the queried color, wherein said autonomous method is a software App residing in the general computing machine.

9. The autonomous method of claim 8 further comprising step of:
  guiding the user to one or more color merchandises relating to the queried color.

10. The autonomous method of claim 9, wherein the step of guiding the user to the one or more color merchandises relating to the queried color includes step of communicating another oral response of a coordinate of the one or more color merchandises to the user.

11. The autonomous method of claim 9, wherein the step of guiding the user to the one or more color merchandises relating to the queried color includes step of highlighting the one or more color merchandises to the user.

12. The autonomous method of claim 8 further comprising step of:
  receiving another oral query from the user concerning one or more colors that match with the queried color.

13. The autonomous method of claim 12 further comprising step of:
  receiving another oral response from the user concerning an application for the queried color.

14. The autonomous method of claim 12 further comprising step of:
  communicating another oral to the user with one or more recommended colors.

15. The autonomous method of claim 1 further comprising step of:
  displaying a room scene to the user.

16. The autonomous method of claim 15 wherein the step of displaying a room scene to the user further includes coloring said room scene with at least one of the queried color and one or more recommended colors.

17. The autonomous method of claim 16, wherein said room scene is obtained from a room image database.

18. The autonomous method of claim 16, wherein said room scene is provided by the user.

* * * * *